United States Patent [19]
Pantke et al.

[11] 3,883,123
[45] May 13, 1975

[54] APPARATUS FOR THE REDUCTION OF IRON ORES BY DIRECT REDUCTION

[75] Inventors: Heinz-Dieter Pantke, Essen-Frintrop; Ulrich Pohl, Mulheim (Ruhr), both of Germany

[73] Assignee: Thyssen Niederrhein AG Hutten- und Walzwerke, Oberhausen, Germany

[22] Filed: Sept. 24, 1973

[21] Appl. No.: 400,058

[30] Foreign Application Priority Data
Sept. 23, 1972 Germany.............................. 2246885

[52] U.S. Cl............................................ 266/29; 75/35
[51] Int. Cl............................................. F27d 13/00
[58] Field of Search........ 75/33, 34, 35, 37; 266/20, 266/25, 29, 30

[56] References Cited
UNITED STATES PATENTS
3,189,438  6/1965  Bogdandy............................ 266/29
3,375,098  3/1968  Marshall.............................. 266/29
3,458,307  7/1969  Marshall.............................. 266/29

FOREIGN PATENTS OR APPLICATIONS
975,444    1951    France................................... 75/35

Primary Examiner—Roy Lake
Assistant Examiner—Mark S. Bicks
Attorney, Agent, or Firm—Karl F. Ross; Herbert Dubno

[57]     ABSTRACT

An apparatus for the direct reduction of iron ore, e.g. in a shaft furnace, comprises a pair of reducing-gas generating reformers which are alternately heated and functionally interchanged to produce the reducing gas. Downstream of each of the reformers is an air-preheating heat exchanger and between both reformers and the direct-reduction furnace there is provided a buffer heat exchanger. The combination reduced the fluctuations of the reducing-gas temperature at the inlet to the direct-reduction furnace and is able to maintain a reducing-gas temperature close to the desirable maximum for effective reduction.

9 Claims, 2 Drawing Figures

APPARATUS FOR THE REDUCTION OF IRON ORES BY DIRECT REDUCTION

FIELD OF THE INVENTION

The present invention relates to an apparatus for the reduction of iron ore and, more particularly, to an installation for the direct reduction of pellets, particles, granules or briquettes of iron ore to sponge iron. The invention also relates to a method of operating an installation for the direct reduction of iron ores.

BACKGROUND OF THE INVENTION

In the reduction of iron ores to metallic iron, increased interest has been shown of late in systems for the direct reduction of iron ore, in the form of pellets, granules, particles and briquettes, in shaft-type furnaces. In such systems, a charge or iron ore is caused to descend in the shaft furnace in counterflow to a rising stream of reducing gas, generally consisting largely of carbon monoxide and hydrogen. The reducing gas may be produced from process hydrocarbons, consisting mainly or especially of methane, by reformation of the gaseous hydrocarbons with gases containing oxygen, e.g. air, furnace exhaust gas, etc. in reformers which may operate alternately to provide a continuous flow of the reducing gas.

The product is metallized iron-containing sponge or sponge iron which may then be smelted elsewhere and can be used as the starting material for a steel-making or other refining process.

When the reformer is not being used for the production of the reducing gas it may be heated by combustion or regenerative techniques. In the next cycle or phase, the heated generator is used to produce the reducing gas while the heat-depleted regenerator is heated as described above. The term "reformer" as used herein is thus used to refer to Cowper-like vessels provided with heat storage masses in the form of regeneratively heated lattice works of ceramic bricks or the like.

In a conventional system, wherein the reformers are constituted by simple Cowpers traversed alternately by the process hydrocarbons and gasification medium, the reformers feed the reduction furnace directly. The reformation reactions can include the following:

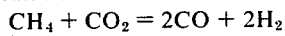
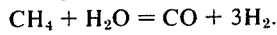

$CH_4 + CO_2 = 2CO + 2H_2$
$2CH_4 + O_2 = 2CO + 4H_2$
$CH_4 + H_2O = CO + 3H_2$.

These reactions, among others, are generally endothermic, deriving the heat necessary to drive the reactions from the previously heated latticework of the reformers. Thus the temperature of the product, i.e. the reducing gas, falls from the start to the end of the reformation cycle and the temperature of the reducing gas introduced into the reducing furnace may fluctuate by several hundreds of degrees Centigrade. While such fluctuations have generally been tolerated heretofore, they disadvantageously affect the reducing process and especially the rate at which the iron ore is reduced. The problem is significant whether the reforming or gasification medium is oxygen or the furnace waste gases which are rich in carbon dioxide and water vapor.

OBJECTS OF THE INVENTION

It is the principal object of the present invention to provide an improved apparatus for the direct reduction of iron ores whereby the aforementioned disadvantages are obviated.

Another object of the invention is to provide an apparatus for the reduction of iron ore which provides a substantially constant reducing-gas temperature at the inlet to the shaft furnace, and which reduces the fluctuations in the reducing-gas temperature, thereby ensuring a substantially constant reduction furnace.

Still another object of the invention is to provide an improved method of operating a plant for the direct reduction of iron ores and for the production of sponge iron using process hydrocarbons, especially methane, and the raw material for the reducing gas.

SUMMARY OF THE INVENTION

These objects and others which will become apparent hereinafter are attained, in accordance with the present invention, in an apparatus for the reduction of iron ores by direct reduction which comprises a shaft furnace receiving reducing gases and passing them upwardly through a gas-permeable charge of iron ore descending in the furnace, to form sponge iron, and an improved system for the generation of the reducing gas from gaseous process hydrocarbons, especially methane, the latter system comprising two alternately heated and gas-producing regeneratively heat-storing reformers which operate alternatingly and periodically are functionally interchanged to produce a continuous flow of the reducing gas.

The invention resides in providing at the discharge side or downstream end of each reformer a regenerative air preheating heat exchanger and between both of the latter heat exchangers and the furnace, a common buffer heat exchanger.

The heating of the reformers alternately, is effected by passing combustion air through the regenerative air preheater and effecting combustion at the inlet to the reformer of a hydrocarbon fuel, the combustion gases then traversing the reformer to heat the latter. During the reforming operation, the process hydrocarbon is mixed with the gasification medium, i.e. an oxidizing gas, and is passed through the reformer in the opposite direction, being converted to the reducing gas. From the reformer, the reducing gas passes the regeneratively heated air preheater and the buffer heat exchanger, which likewise has a regeneratively heated mass, before entering the shaft furnace at a substantially constant final temperature of the reducing gas. The combustion of the fuel with the combustion air is effected with the use of a burner at the inlet at the reformer, i.e. between each reformer and its air preheater.

The reformation of the process hydrocarbon, especially methane, with the oxidizing medium can be carried out purely thermally or by a combination of thermal and catalytic processes. When the reformation is carried out thermally it is important to maintain a reformer temperature (at its minimum) which is designed to prevent the formation of soot or carbon black. In this case, the material balance and the heat balance are so established that the reducing gas is substantially free from carbon dioxide, oxygen and water vapor.

Preferably the reformation is carried out catalytically in which case the heat storage mass is composed of a catalytic material conventional in the art and capable of effecting the aforestated reaction, or similar catalytic material is precipitated upon or coated onto the latticework of each reformer. The advantage of a catalytically effective heat-storage mass in the reformer resides in the greater efficiency of conversion of the process hydrocarbon to carbon monoxide and hydrogen and in the greater degree of such conversion.

The reformation can be effected with air or the furnace waste gases as the oxidizing medium according to the equations generalized above. As previously noted, the furnace exhaust gas contains carbon dioxide and water vapor which with the hydrocarbon can be transformed into carbon monoxide and hydrogen. Furnace exhaust gases have the advantage of recovering thermal energy in the effluent gases from the furnace and requiring lower expenditure of energy. In any event auxiliary burners may be required in addition to a feedback duct system for returning the exhaust gases to the burner region or air preheating region of the furnace.

The fuel used to heat the reformer may be branched from the process hydrocarbon stream although, as noted, the reformers are preferably heated at least in part by the furnace exhaust gases which are recirculated.

The system of the present invention makes use of a regenerative reformation of the hydrocarbon to reducing gases and thereby allows operation at relatively high temperatures of the type used in blast furnace Cowpers. Because higher temperatures are employed than are usually used, an excess of the oxidizing medium for complete reformation of the process hydrocarbon is not necessary. Reducing gas of high quality (i.e. a high degree of freedom from carbon dioxide, water vapor and oxygen) is obtained.

The higher the reformation temperature the lower can be the catalytic activity of the catalyst in the heat storage lattice of the reformer. The catalytic material may thus be of lower cost and of a longer useful life. Furthermore, when operating with gases containing catalyst poisons such as sulfur, the poisons on the latticework of the reformer are deposited only during the reformation cycle and are burned off during the subsequent heating cycle. The catalyst is thus self-regenerating with each reheating.

In this manner it is possible to obtain all of the advantages of a regenerative operation, and surprisingly, to maintain a substantially constant reducing gas temperature in the inlet to the shaft furnace. Expensive control apparatus and technology can be eliminated thanks, in large measure, to the use of the buffer heat exchanger which can be constructed in accordance with conventional regenerative latticework principles. Since the temperature can be adjusted with ease, e.g. by dimensioning the gas flow through the several regenerators, the maximum reduction efficiency and thermal efficiency of the entire plant can be maintained. Significant heat losses then occur and substantially all of the energy remains in the system.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
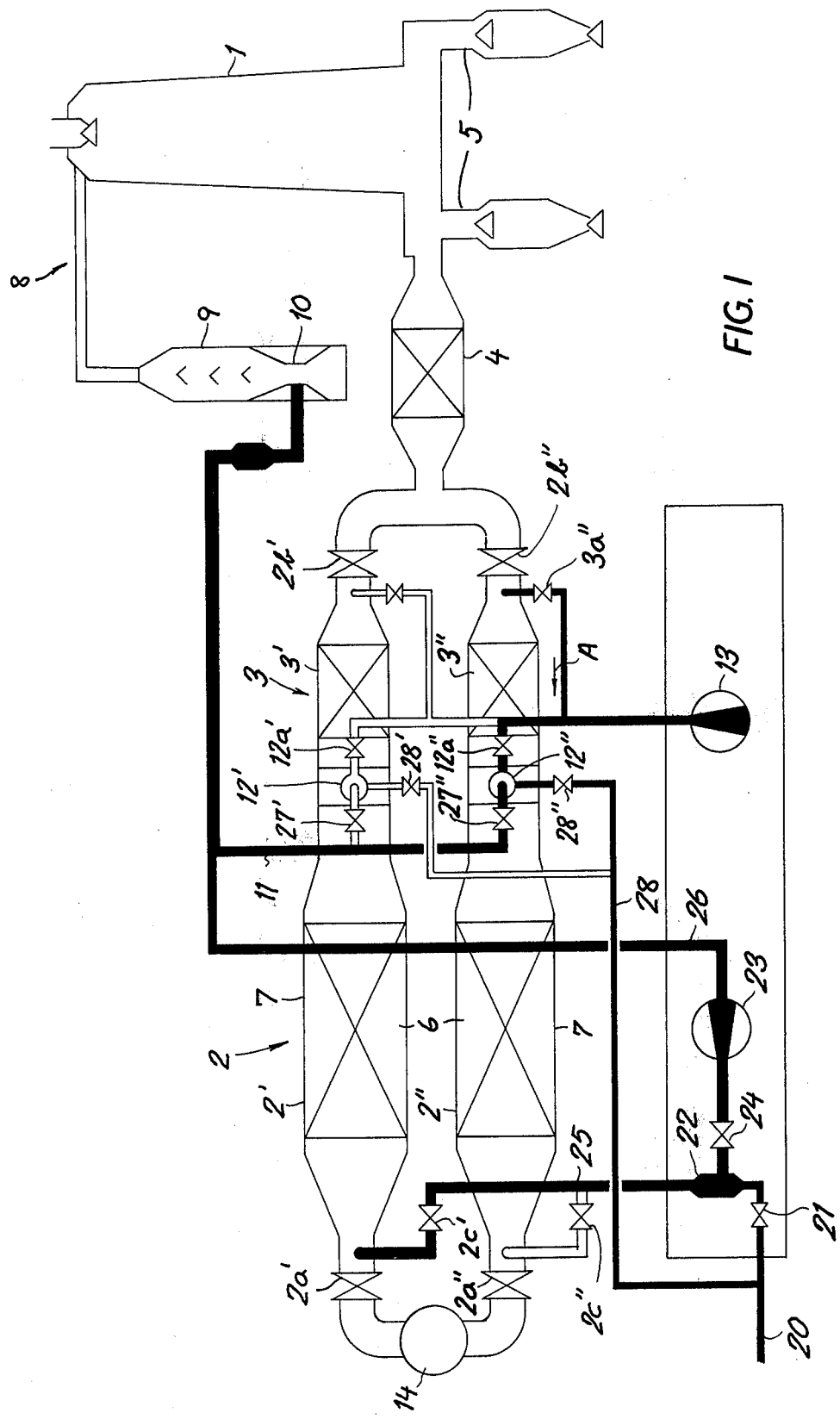
FIG. 1 is a flow diagram illustrating a plant for carrying out the present invention, connected for recirculation of the furnace exchaust gases as reformer-heating medium.
Figure 2:
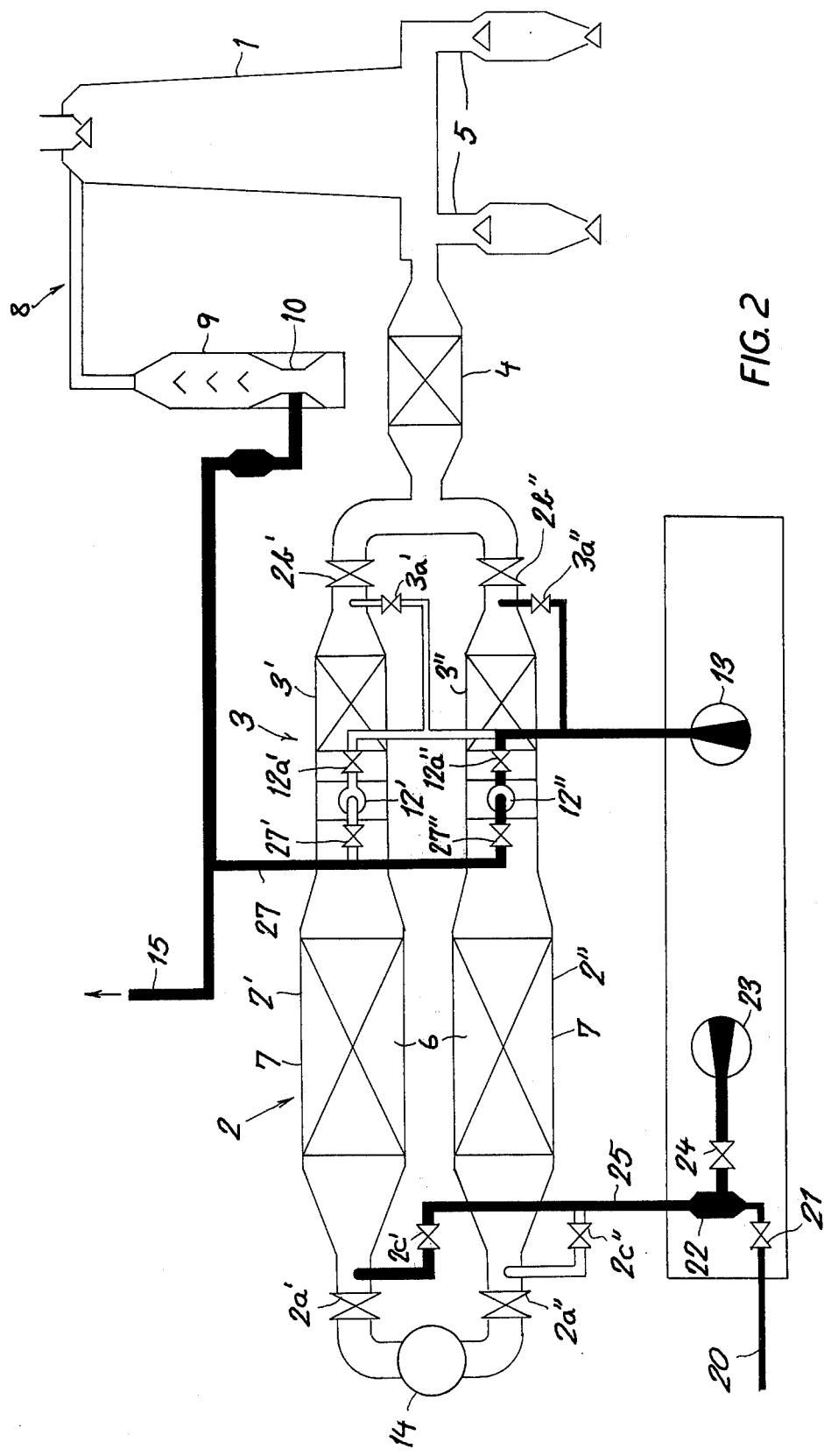
FIG. 2 is a view similar to FIG. 1 showing the system connected for use of air as the oxidizing medium for the process hydrocarbon.

In FIGS. 1 and 2 of the drawing, there is shown an apparatus for the reduction of pelletized or granular iron ores, the bodies being produced by any conventional or upgrading, technique, by means of direct reduction. The apparatus comprises a shaft furnace which is charged at the top with the iron ore pellets and is provided at the bottom 5 with means for periodically or continuously removing sponge iron from the furnace. The shaft furnace 1 is connected at its bottom to a system 2 for producing the reduction gas from a gaseous process hydrocarbon, especially methane.

The reducing gas generating system 2 comprises a pair of reformers 2' and 2'' which are connected in parallel but are provided with valves $2a'$, $2a''$ and $2b'$, $2b''$ enabling the reformer to be operated alternately for reformation and reheating and to be functionally interchangeable for this purpose. Each of the reformers 2', 2'' is provided at its discharge end with a regenerative air preheating heat exchanger 3', 3'' of the air preheater arrangement represented generally at 3. The discharge or downstream end of the air preheaters 3' and 3'' are connected to a common regenerative heat exchanger 4 forming the buffer heat exchanger mentioned previously and connected in common between both of the reformers 2', 2'' and the shaft furnace 1.

Valves $3a'$ and $3a''$ communicating with the downstream end of each air heater 3', 3'' are connected to a compressor 13 which constitutes a source of combustion air and serves to pass combustion air through the regenerative air heaters 3' and 3'' in the direction from the downstream end to the upstream end of each of these heat exchangers. A pair of burners 12' and 12'' open into the regenerative reformer 2' and 2'' at their downstream end and are supplied with air via valves $12a'$ and $12a''$ from the compressed air source 13.

At the upstream ends of each reformer 2', 2'', the valves $2a'$ and $2a''$ communicate with a common chimney or stack 14.

Process hydrocarbon, especially methane, can be introduced by a duct 20 controlled by a valve 21 to a mixing chamber 22 to which air from a compressor 23 is supplied via a valve 24 when the gasification or oxidizing medium is air. The mixture of oxidizing medium and methane is supplied via a conduit 25 and valves $2c'$ and $2c''$ to the respective reformers 2' and 2'' at their upstream ends.

In the system of FIG. 1, the gasification medium is furnace exhaust gas and, in this case, the compressor 23 is supplied by duct 26 with the furnace exhaust gas which can be led by valve 24 to the mixing chamber 22 previously described. The mixing chamber is supplied with process hydrocarbon via line 20 and valve 21 and discharges the mixture to be reformed via line 25 and valves $2c'$ and $2c''$ into the reformers 2' and 2'' at their upstream ends.

Each of the reformers 2', 2'' is provided with a diagrammatically represented heat-storage latticework 5 of refractory ceramic and may be provided with a catalytic coating or body as previously described. Each reformer 2', 2" and the associated air preheater 3 are formed in a common or unitary housing represented at 7.

Furnace exhaust gases are recovered by the feedback loop 8 which includes a washing tower 9 with a condenser 10 to remove particulates and excess water vapor. In the system of FIG. 2, a portion of the furnace exhaust gas may be discharged for other purposed as represented at 15 while the remainder is branched at 27 to the valve 27' and 27" feeding the burner 12' and 12". Consequently, the furnace exhaust gas here serves as the fuel for the combustion process. In the embodiment of FIG. 1, a line 11 carries the furnace exhaust gas to the burners 12 which are additionally supplied with hydrocarbon fuel via a line 28 and valves 28', 28".

In operation, it may be assumed that the reformer 2' has previously been heated in a manner to be described in greater detail below. Valve 2a' is closed while valve 2b' is open and a mixture of methane and furnace-associated gas from mixing chamber 22 is admitted to the upstream of reformer 2' via the valve 2c'. The reduction gases traverse air preheater 3 (valves 27', 28' and 12a' being closed) and enter the buffer heat exchanger before passing through the reducing furnace 1 at the base of the charge therein. The reducing gases react with the iron ore descending in the furnace and are converted largely to a mixture of carbon dioxide, water vapor, unoxidized carbon monoxide and hydrogen while the iron ore is transformed into sponge iron.

Simultaneously, valve 2a" is open while valve 2b" is closed and compressed air is forced by the blower 13 through the valve 3a" to traverse the air preheater 3" in the direction of arrow A. Additional air is delivered via valve 12a" to the burner 12 to which fuel is supplied via valve 28" and combustible associated gas is supplied by valve 27" to effect combustion in the preheated air reaching the burner at the downstream end of the reformer 2". The hot combustion gases traverse the reformer 2" before being discharged through the chimney 14, thereby heating the heat-storage mass within reformer 2".

When the temperature of the reducing gases at the end of the reformer 2' has dropped to a minimum level, the reformers 2' and 2" are functionally interchanged. Thus valves 2a' and 2b" are opened whereas valves 2a" and 2b' are closed. A mixture of methane and recirculated furnace exhaust gas via line 26 is supplied via open valve 2c" to the now heated reformer 2" while valve 2c" is closed. Similarly, the burner 12" is rendered operative while the burner 12" is inactivated and reformer 2' is heated while the reformer 2" is used to generate reducing gas. The system of FIG. 2 operates similarly except that air is delivered as the gasification medium to the mixer 22. Of course, valves 27' and 27" may be provided simply to admit furnace exhaust gas to the downstream end of the reformers 2' and 2", the heat-depleted exhaust gas being delivered to the chimney 14 when a transfer of sensible heat from the exhaust gas to the latticework in the reformers is desired.

SPECIFIC EXAMPLES

In an apparatus as described for the reduction of iron ore in a shaft furnace 1 and using regeneratively driven reformer 2, 43,000 standard m³/hr of reduction gas is produced and continuously supplied to the furnace 1. The temperature of the reduction gas in the gas inlet to the furnace is to be held to a maximum of 950°C since above this temperature the reduced ore manifests some softening.

One reformer 2 is heated to 1400°C by combustion as previously described while the other is being employed to generate the reducing gas. After each 30 minutes the reformers are functionally interchanged, i.e. the reformer in use to produce the reducing gas is switched into its heating mode whereas the reformer previously being heated is switched into its reducing gas production mode.

At the beginning of the reforming cycle, the reducing gas emerges from the catalytic part of the reformer and enters the air preheater at a temperature of about 1300°C while, at the end of this period, the temperature is 1200°C.

a. Operation Only With Preheating Heat Exchanger 3 (Without Buffer Heat Exchanger 4)

At the beginning of the reformation period the hot reducing gas at a temperature of 1300°C is cooled to 700°C at the inlet to the furnace. The heat is consumed in the endo thermic reaction and the temperature of the heat storage mass is likewise raised so that, at the end of the reformation cycle, the temperature of the reducing gas falls to 1200°C and the temperature supplied to the furnace is 950°C. Using the preheater 3 alone, therefore, the temperature of the reducing gas varies periodically at the furnace input between 700°C and 950°C with median temperature of 325°C.

b. Operation With Preheater 3 and Small Buffer Heat Exchanger 4

When the buffer heat exchanger is provided between the preheaters 3 and the shaft furnace and has a packing of 45 metric tons of refractory bricks used for blast furnace air heaters, 13,900 standard m³/hr of heated combustion air is produced in the preheating exchanger and is fed to the combustion zone. In this case, in the beginning of the reformation period, the reducing gas temperature of 1300°C is reduced through the preheating exchanger and the buffer heat exchanger 4 to 890°C at the entrance to the furnace. At the end of this period the temperature of 1200°C is reduced to 950°C so that the periodic fluctuation is reduced to 60°C with a median temperature of 920°C c. Operation With Air Preheater and Large Buffer Heat Exchanger In this case the buffer heat exchanger has a mass which is increased by comparison to (b) from 45 metric tons to 60 metric tons. 12,150 standard m³/hr of heated air is provided for combustion. At the beginning of the reformation period the reducing gas temperature drops from 1300° to 940°C upon traversing the heat exchangers 3 and 4 while, at the end of this period, the reducing gas temperature at the same point is 900°C. The periodic fluctuation of the reducing gas temperature is only 10°C and the mean temperature is 945°C only a trifle below the maximum of 950°C.

A lower reduction temperature can be brought about by increasing the air quantity as indicated.

We claim:

1. An apparatus for the reduction of iron ore, comprising a reducing furnace; a pair of regeneratively heatable gas reformers; a pair of regenerative air preheaters each respectively connected at a downstream end of a respective one of said reformers; a regeneratively heat storing buffer heat exchanger disposed in common between said air preheaters and said furnace for heating gas cooler than the buffer heat exchanger and cooling gas hotter than the latter; means for feeding combustion air to said heaters alternately and sustaining combustion to produce combustion gases traversing the respective reformer; means for passing a mixture of hydrocarbon and an oxidizing medium through said reformer alternately and the respective heaters and conversion to reducing gas; and means for functionally interchanging said reformer between a heating mode and a reducing gas producing mode.

2. The apparatus defined in claim 1 wherein each of said reformers are provided with catalytically effective heat storage latticeworks.

3. The apparatus defined in claim 1 where each of said reformers and the respective heater is formed in a common housing.

4. The apparatus defined in claim 1 further comprising means for recovering exhaust gas from said furnace and returning at least a portion of the recovered exhaust gas as said oxidizing medium to said reformer in admixture with said hydrocarbon.

5. The apparatus defined in claim 1 further comprising means for recovering an exhaust gas from said furnace and feeding at least a portion of the recovered furnace exhaust gas through said reformer for heating same.

6. The apparatus defined in claim 1 further comprising means for recovering exhaust gas from said furnace and feeding at least a portion of said exhaust gas for combustion in said air to heat the reformer.

7. The apparatus defined in claim 1 further comprising means for feeding air to said reformer as said oxidizing medium.

8. The apparatus defined in claim 1 further comprising a respective burner disposed between each of said heaters and the respective reformer, and means for feeding a portion of said hydrocarbon as a fuel to the burner.

9. The apparatus defined in claim 8 further comprising means for feeding air to said burner.

* * * * *